(12) United States Patent
Kurkowski et al.

(10) Patent No.: US 12,389,057 B2
(45) Date of Patent: Aug. 12, 2025

(54) SYSTEMS AND METHODS FOR PREDICTIVE CONTENT DELIVERY

(71) Applicant: Comcast Cable Communications, LLC, Philadelphia, PA (US)

(72) Inventors: Stuart Kurkowski, Colorado Springs, CO (US); Neill Kipp, Greenwood Village, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 28 days.

(21) Appl. No.: 18/481,826

(22) Filed: Oct. 5, 2023

(65) Prior Publication Data

US 2025/0119609 A1    Apr. 10, 2025

(51) Int. Cl.
*H04N 21/2668* (2011.01)
*H04N 21/239* (2011.01)
*H04N 21/433* (2011.01)
*H04N 21/81* (2011.01)
*H04N 21/845* (2011.01)

(52) U.S. Cl.
CPC ..... *H04N 21/2668* (2013.01); *H04N 21/2393* (2013.01); *H04N 21/433* (2013.01); *H04N 21/812* (2013.01); *H04N 21/8455* (2013.01)

(58) Field of Classification Search
CPC ........... H04N 21/2668; H04N 21/2393; H04N 21/433; H04N 21/812; H04N 21/8455
See application file for complete search history.

(56) References Cited

U.S. PATENT DOCUMENTS 12,022,137 B1 *   6/2024   Shams .................. H04N 21/232
2010/0175079 A1 *   7/2010   Braun ...................... H04N 7/00

FOREIGN PATENT DOCUMENTS

WO    WO2008021236 A2 *   2/2008   ............. G06Q 10/00

* cited by examiner

*Primary Examiner* — Anthony Bantamoi
(74) *Attorney, Agent, or Firm* — BakerHostetler

(57) ABSTRACT

Methods and systems are described herein to predict events within a content stream. Based on the predicted events, information may be embedded within the stream. A computing device that receives the content stream may detect the predicted event and may wait a randomly generated time before requesting information associated with the predicted event, such as requesting an advertisement to output. After detecting the predicted event, the computing device may wait a randomly generated time before requesting an advertisement. The system may respond to the computing device with an instruction or with supplemental content, such as with an advertisement for later output. The computing device may cache the advertisement. The computing device may detect the actual marker indicating a timestamp for when the advertisement should be output. The computing device may output the advertisement at the time indicated by the timestamp.

20 Claims, 6 Drawing Sheets

300

RECEIVE, FROM A COMPUTING DEVICE, A REQUEST FOR CONTENT 302

SEND, TO THE COMPUTING DEVICE, A MANIFEST COMPRISING FIRST SIGNAL DATA ASSOCIATED WITH THE REQUESTED CONTENT AND SECOND SIGNAL DATA IN RESPONSE TO THE REQUEST 304

RECEIVE, FROM THE COMPUTING DEVICE, THE SUBSEQUENT REQUEST FOR SUPPLEMENTAL CONTENT AFTER THE RANDOM TIME PERIOD AND BASED ON THE SECOND SIGNAL DATA 306

SEND, TO THE COMPUTING DEVICE, THE SUPPLEMENTAL CONTENT BASED ON THE SUBSEQUENT REQUEST 308

SYSTEMS AND METHODS FOR PREDICTIVE CONTENT DELIVERY

BACKGROUND

Content, such as linear content, may be viewed by a viewer at a time of broadcast. Popular content, including live content (e.g., a football championship game), may attract millions of simultaneous viewers. A large number of simultaneous viewers may result in corresponding large numbers of requests for advertising content from playback devices. Near-simultaneous attempts to provide advertising content, such as targeted advertisements, may burden a content provider's decision system with an extreme instantaneous load and may cause significant processing delays. A content provider may not be able to provide viewers with immediate playback of content and this may result in a poor viewing experience. Therefore, improvements in content providing techniques are needed.

SUMMARY

This Summary is provided to introduce concepts that are further described herein. This Summary is not intended to be used to limit the scope of the claimed subject matter.

Methods and systems are described herein to predict events within a content stream. Based on the predicted events, information may be embedded within the stream. A computing device that receives the content stream may detect the predicted event and may wait a randomly generated time before requesting information associated with the predicted event. For example, the predicted event may comprise a marker indicating that an advertisement should be requested and cached for later output. The computing device may receive a manifest file including one or more predicted markers associated with the content stream. In accordance with the techniques described herein, after detecting the predicted event (e.g., by detecting the predicted marker in the stream), the computing device may wait a randomly generated time before executing the instructions associated with the predicted event. For example, the computing device may request an advertisement after the randomly generated time. The system may respond to the computing device with an indication of which supplemental content to output, such as with an advertisement for later output or with information enabling the computing device to retrieve the advertisement for later output. The computing device may cache the advertisement. The computing device may detect the actual event (e.g., an actual marker indicating a timestamp for when the advertisement should be output) and may output the cached advertisement at the time indicated by the timestamp.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Methods and systems are described herein to predict events within a content stream. While scheduling information may be utilized to reduce signal traffic between computing devices and content delivery networks (CDNs) during the delivery of content, network congestion issues may still develop when too many computing devices send requests at the same time. For example, when too many computing devices request advertisements (e.g., after detecting advertising markers in content metadata), network congestion issues may develop. In cases where it is predicted that a high number of computing devices will request advertising content, such as during a championship game, it may be desirable for the computing devices to wait a randomly generated time before requesting the advertising content to prevent overloading the content delivery system.

In accordance with the techniques described herein, a computing device that receives a content stream may wait a randomly generated time before requesting information associated with a predicted event. For example, the predicted event may comprise a marker indicating that an advertisement should be requested and cached for later output (e.g., a marker instructing the computing device to request an advertisement for an upcoming ad break indicated by the marker in the stream). The computing device may receive a manifest indicating one or more predicted markers associated with the content stream. After detecting the predicted marker indicating a predicted event, the computing device may wait a randomly generated time before executing the instructions associated with the predicted event. For example, the computing device may request an advertisement after the randomly generated time. In this way, the timing of each computing device's request for content (e.g., instructions regarding which advertisements to request and cache for later output) may be randomized. The system may be prevented from being overloaded because the predicted marker(s) are included in the manifest, and the system may be further prevented from being overloaded because randomized requests for supplemental content associated with the predicted markers do not occur simultaneously. The randomly generated time may be determined by the computing device or determined by the system. For example, the manifest may indicate the random time for the computing device to make the request. The system may respond to the computing device with an indication, such as with an indication of which advertisement to later output or with information enabling the computing device to retrieve the advertisement for later output. The computing device may cache the advertisement. The computing device may detect the actual marker indicating a timestamp for when the advertisement should be output. The computing device may output the advertisement at the time indicated by the timestamp.

Figure 1:
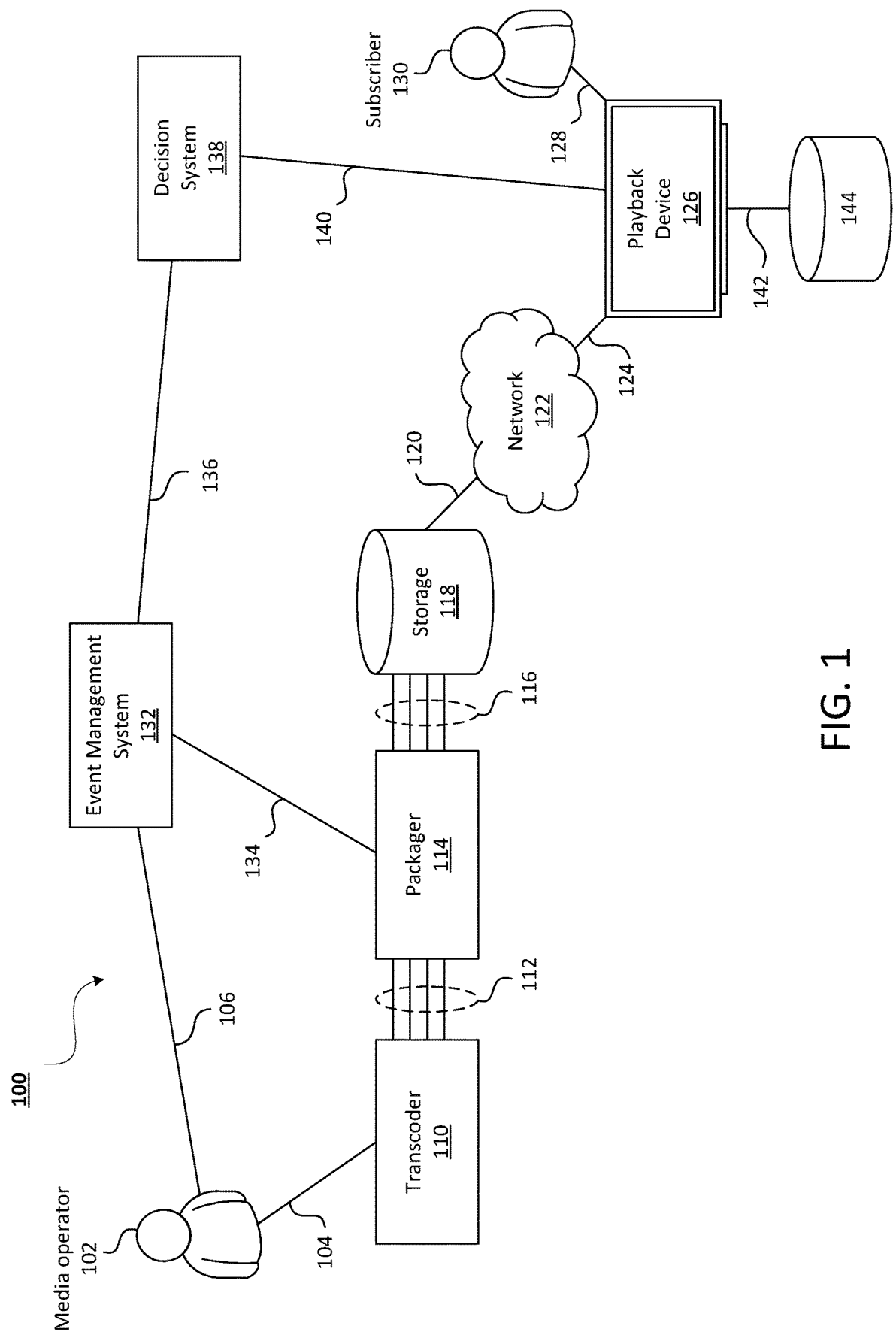
FIG. 1 illustrates a block diagram of an example.

FIG. 1 illustrates an example system 100 in which the techniques described herein may be implemented. The system 100 may include, for example, a media operator 102, a transcoder 110, a packager 114, storage 118, a network 122 (e.g., a CDN), a playback device 126, a subscriber 130, an event management system 132, a decision system 138, and a local content datastore 144. The system 100 may be associated with a content provider. The content provider associated with the system may distribute transcoded and packaged content to a computing device, such as playback device 126 (e.g., for viewing or consumption by subscriber 130). The various components of the system 100 may be in communication via one or more wired or wireless networks (e.g., network 122).

The media operator 102 may provide source media content (e.g., a content stream 104) to the transcoder 110. The media operator may include a source media content database, e.g., including source media content and source media content schedule data. The content stream 104 may include, for example, content, such as linear video content. Content may refer generally to any content such as video content or audio content for viewer consumption regardless of the type, format, genre, or delivery method. Content may comprise video content produced for broadcast via over-the-air radio, cable, satellite, or the internet. Video content may comprise a movie, a television show or program, an episodic or serial television series, or a documentary series, such as a nature documentary series. In another example, video content may include a regularly scheduled video content series, such as a nightly news program. The content stream 104 may be associated with one or more content providers that distribute the content to viewers for consumption.

The event management system 132 may receive one or more events policies 106 from the media operator 102. Moreover, the event management system 132 may maintain a library of predicted media events and corresponding media policies (e.g., SCTE-224). For example, at the stream origin (e.g., media operator 102), a marker (which may also be referred to as a stream signal) may be inserted in the content stream 104 (e.g., a cue to request an advertisement may be inserted into the content stream). The marker may comprise one or more embedded signals, including a frame-accurate timestamp (e.g., SCTE-35) and metadata that associates the marker with a media event. The marker may propagate through the transcoder 110, packager 114, and network 122. The marker may be received by playback device 126. Upon detection of the marker in the content stream, the playback device 126 may request information associated with the marker. For example, the playback device 126 may request information associated with the marker from the decision system 138. The decision system 138 may comprise an advertisement decision system that provides targeted advertisements for output by playback devices. This request may include information associated with the playback device 126 such as zip code and device type. The playback device 126 may receive an indication 140 from the decision system 138. The indication 140 may, for example, comprise an indication of which advertisement to later output or information enabling the computing device to retrieve the advertisement for later output. The indication 140 may alternatively include instructions to output an advertisement that is locally stored or switch to a different stream source.

Because popular live content, such as a large championship football game, may attract millions of simultaneous viewers, identical markers may be distributed to millions of playback devices simultaneously. The subsequent, near-simultaneous attempts by playback devices to request information associated with the markers in content may burden the decision system 138 with extreme instantaneous load thereby causing significant processing delays. Moreover, attempts to respond to a request (e.g., a request for a targeted advertisement) may overload an advertising decision system. Furthermore, the system may be burdened with simultaneous requests to provide advertisements that may not already be cached.

In order to alleviate these possible extreme loads, the system may predict stream events. For example, the event management system 132 may provide one or more predicted markers 134 to the packager 114. The one or more predicted markers 134 may be processed prior to the arrival of each corresponding actual marker (e.g., the playback device 126 may request an advertisement after detecting the predicted marker and in advance of the actual marker's arrival). For example, a predicted marker may include an embedded signal associated with a targeted advertisement. Based on the embedded signal, the playback device may request and cache the targeted advertisement in advance of receiving the actual marker associated with playing the targeted advertisement. This may relieve burdens associated with a multitude of playback devices requesting content simultaneously at the time of receipt of the actual markers.

In accordance, with the techniques described herein, the system may determine a predicted viewership of content based on numerous factors, including but not limited to historical data (e.g., past viewership of related content), political significance, current events (e.g., weather, natural disasters, matters of public concern), geography (e.g., content of local or national interest), etc. For example, the event management system 132 may determine a predicted viewership of content. Based on the predicted viewership, the event management system 132 may generate the predicted markers. The predicted markers may include information related to the predicted event, such as an upcoming signal (e.g., a cue) used to identify an upcoming advertising break. For example, the predicted marker may identify points where supplemental content, such as advertisements or local content, may be inserted into the content stream. The system may determine a random time duration between a current time and the time for a playback device to request information associated with the predicted marker. For example, this random time may indicate when to request content such as advertising content upon detection of the predicted marker. For example, the event management system 132 may determine that viewership of a sporting event will be high based on previously high viewership of similar sporting events, generate one or more predicted markers to include in the manifest based on the high predicted viewership, and generate a random time for each playback device to request information related to the predicted markers (e.g., to request supplemental content).

The transcoder 110 may output one or more content streams 112 in different container formats, different bitrates, different resolutions, etc. Transcoding the content may comprise a process in which the original content is decoded to an intermediate uncompressed format, which is then encoded into the target content format. For example, the transcoder may output the or more content streams 112 in different container formats, including MPEG-4 (MP4), Dynamic Adaptive Streaming over HTTP (DASH, also known as MPEG-DASH), or HTTP Live Streaming (HLS). Moreover, the one or more content steams 112 may be output by the transcoder 110 at different bitrates and resolutions, including audio-only output. The transcoder 110 may enhance the video output, including cropping video dimensions, inserting overlay images or animations, or inserting ad keyframes to allow video player clients to insert advertisements.

Once transcoded, the content may be packaged. Packaging the content may reshape the content so that it is suitable to reach various computing devices of various viewers. For example, a plurality of profiles may need to be created with different resolutions to accommodate varying screen sizes and different bitrates to match available bandwidth. Each of these many profiles may be prepared or "packaged" for each adaptive bitrate streaming format, such as Apple HLS, Microsoft Smooth Streaming, Adobe HDS or MPEG DASH. The packaging step may also include encryption to enable security. These profiles, in each of the adaptive bitrate streaming formats, may be stored on a server to be delivered when the content is requested by a viewer. In the system of FIG. 1, the one or more content streams 112 may be used by the transcoder 110 to configure an assigned packager (e.g., packager 114), with a transcoder configuration. The packager 114 may initiate the packaging process and may output one or more manifests 116. The one or more manifests 116 may instruct a playback device (e.g., playback device 126) to render content. Additional content, such as advertising content, may be listed in the one or more manifests 116. The packager may copy the manifest to the storage 118.

The predicted markers may be inserted (e.g., by the packager 114) into the content stream (e.g., a linear content stream). The packager 114 may request the predicted markers from the event management system 132 (e.g., which may maintain a library of predicted media events and corresponding policies). The packager 114 may generate a manifest and copy a list of the predicted markers into the manifest. When the playback device 126 requests the manifest, it may receive the list of predicted markers and wait a random time duration before requesting information associated with each predicted marker. Waiting the random time duration may spread out requests to the decision system 138. The decision system 138 may, for example, comprise a linear content decision system or an advertising decision system. For example, a marker may comprise an instruction to request an advertisement from an advertising decision system causing the playback device 126 to send, based on the marker, an advertisement request to the decision system 138. In response to the advertisement request, the decision system 138 may send an indication 140 to the playback device 126 of what supplemental content (e.g., which advertisement) to output. The indication 140 may comprise the supplemental content to be output or information enabling the playback device 126 to retrieve the supplemental content (e.g., a location or URL of the supplemental content).

In an example, the decision system 138 may include the following manifest schema (e.g., MPEG-DASH) for the indication 140 (e.g., an advertisement selected for output):

```
<PredictedSignalList>
    <PredictedSignal
        id="es20220118143001"
        mediaId="nbc/media/KUSA"
        mediaPointId="nbc/media/KUSA/program/25370128/start"
        effective="2022-01-18T14:30:01Z"
        expires="2022-01-18T21:00:00Z"
    />
</PredictedSignalList>
```

When a user of the playback device 126 determines to view content, the playback device 126 may request the manifest associated with the content. The playback device 126 may receive the manifest from the storage 118. For example, storage 118 may communicate 120 with network 122. Moreover, playback device 126 may be in communication with the network 122 (e.g., a CDN). The playback device 126 may output content 128 to a subscriber 130. Because a multitude of playback devices may simultaneously receive a list of markers in the manifest, the decision system 138 may be burdened when the multitude of playback devices simultaneously making requests to the decision system 138 to request information associated with the markers. In accordance with the techniques disclosed herein, to relieve such burdens on the decision system 138, the playback device 126 may wait a random time duration between a current time and the arrival time of an actual marker before making a request to the decision system 138. For example, this random time duration may be received by the playback device 126 from the system. In another example, the playback device 126 may determine the random time based on information in the manifest. After the random time duration, the playback device 126 may send a request to the decision system 138. The decision system 138 may receive the request and respond to the playback device 126 with an indication 140, which may comprise the supplemental content to be output or information enabling the playback device 126 to retrieve the supplemental content (e.g., a location or URL of the supplemental content). The supplemental content may be output by the playback device 126 when the actual marker is detected in the content stream. For example, the playback device 126 may store (e.g., locally) the supplemental content in the local content datastore 144 until arrival of the actual marker. Sending requests after expiration of the random time duration may alleviate congestion in the system. For example, sending requests after expiration of the random time duration to the decision system 138 spreads out requests sent to the decision system 138.

The playback device 126 may execute any part of the instructions received from the decision system 138 that can be executed prior to receiving the actual marker. For example, if the indication 140 instructs the playback device 126 to retrieve and output a targeted advertisement, the playback device 126 may contact an advertising decision system in the background to retrieve a manifest of the targeted advertisement. The playback device 126 may cache the targeted advertisement for later output. The playback device 126 may receive, in the content stream 124, an actual marker with a timestamp. In order to process the marker (e.g., without sending a request to the network 122 or the decision system 138), the playback device 126 may match the marker with the supplemental content (received based on indication 140) that is stored in the local content datastore 144. The playback device 126 may output the supplemental content at the time indicated by the timestamp of the actual marker. The playback device 126 may delete past decisions from the local content datastore 144.

Figure 2:
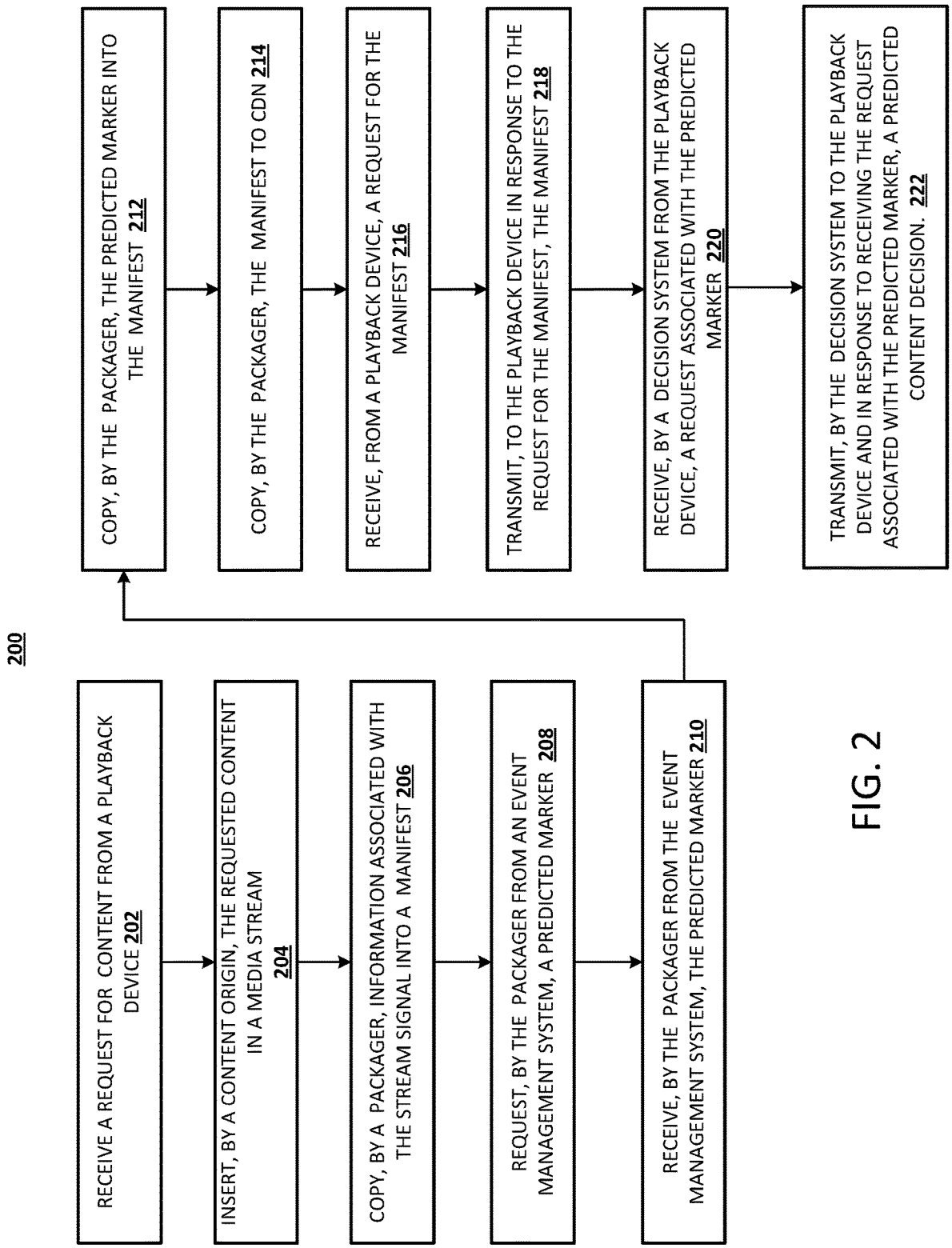
FIG. 2 illustrates an example method.

FIG. 2 illustrates an example method 200. The method 200 may be performed, for example, by the system 100 of FIG. 1. The method 200 illustrates how a media operator, such as the media operator 102 associated with the system 100, may use an event management system and decision system to determine and send predicted markers to indicate when supplemental content requests should be made and randomize the timing of those requests from playback devices (e.g., during time periods of heavy traffic, network congestion, etc.).

At step 202, a request for content may be received from a playback device. For example, the request for the content may be a request for linear content, such as a live sporting event or nightly news broadcast. The request may comprise one or more content identifiers associated with the content.

At step 204, the requested content may be inserted in a media stream by the content origin. The requested content may comprise video or audio content in compressed form. The content origin may format the media stream for transmission over a network to be output by a network device. For example, the request content may comprise a compressed form of the live sporting event or nightly news broadcast.

At step 206, information associated with the requested content may be copied into a manifest by a packager. The manifest may comprise a list of content segments or fragments of video and audio data. The manifest may comprise one or more list associated with one or more versions or renditions of the requested content, as well as additional information such as resolution, bitrate, and other details of each rendition of the requested content.

At step 208, predicted markers may be requested by the packager from an event management system. For example, the predicted marker may be generated or requested in order to alleviate burdens on the content delivery system due to numerous requests for content associated with an actual marker at or near the same time. The predicted marker may be determined based on predicted viewership of content. The predicted viewership of content may be determined by the event management system based on numerous factors, including but not limited to historical data (past viewership of related content), political significance, current events (e.g., weather, natural disasters, matters of public concern), geography (e.g., content of local or national interest), etc.

In some cases, a multitude of devices may simultaneously receive the predicted markers and, if all of the devices simultaneously request data associated with the predicted markers, the content delivery system may still be overloaded. To further alleviate burdens on the content delivery system resulting from simultaneous requests for content associated with the predicted markers, the predicted marker may indicate a randomly generated time for accessing content associated with the predicted markers. The random time duration may comprise a time at some point between a current time and a time of receipt of an actual marker. For example, the event management system may determine that viewership of a sporting event will be high based on previously high viewership of similar sporting events, generate a predicted marker based on the high predicted viewership, and generate a random time duration between a current time and a time of receipt of an actual marker.

At step 210, the predicted marker may be received by the packager from the event management system. In cases of high predicted viewership, the predicted marker may include content (e.g., an advertisement) that is likely to be requested at a future point in time. Moreover, the predicted marker is determined in anticipation of a corresponding actual marker. Content associated with the predicted marker may be requested, received, and cached prior to receiving an actual marker. When an actual marker is received, the actual marker may be matched with a corresponding predicted marker. The cached content associated with the predicted marker may be utilized by the playback device instead of sending a real-time request associated with the actual marker. By caching the content associated with the predicted marker ahead of time, burdens on the content delivery system associated with a multitude of devices simultaneously requesting content associated with the actual markers may be alleviated.

At step 212, the predicted marker may be copied into the manifest by the packager. By incorporating the predicted marker into the manifest, the predicted marker may be listed along with the content segments for the content stream. At step 214, the manifest may be copied by the packager to the CDN storage. The CDN storage may be any source from which a playback device may receive the manifest.

At step 216, a request for the manifest may be received by the CDN from a playback device. For example, a user of the playback device may request content associated with a sporting event and the request for the manifest may be associated with the requested content. At step 218, the playback device may receive the manifest from the CDN in response to the request for the manifest. The manifest may comprise the predicted markers that were received at step 208 and copied into the manifest at step 212.

At step 220, a decision system may receive one or more requests associated with the predicted marker from the playback device. For example, the one or more requests associated with the predicted marker may request supplemental content associated with the predicted marker. Moreover, the predicted marker may indicate a randomly generated time duration and the requests associated with the predicted marker may be sent by the playback device at the random time. For example, in order to alleviate burdens on the system associated with numerous simultaneous requests for content associated with the predicted marker, the predicted marker may indicate a random time between a current time and a time of an actual marker for sending the request.

At step 222, an indication of a content decision may be sent by the decision system to the playback device and in response to receiving the requests associated with the predicted marker. The playback device may store the supplemental content based on the indication. The playback device may receive the actual marker with an actual timestamp. The playback device may match the actual marker with the corresponding predicted marker. The playback device may output the supplemental content at a timestamp of the actual marker using the cached supplemental content. The playback device may delete the content from a local storage once it is output.

Figure 3:
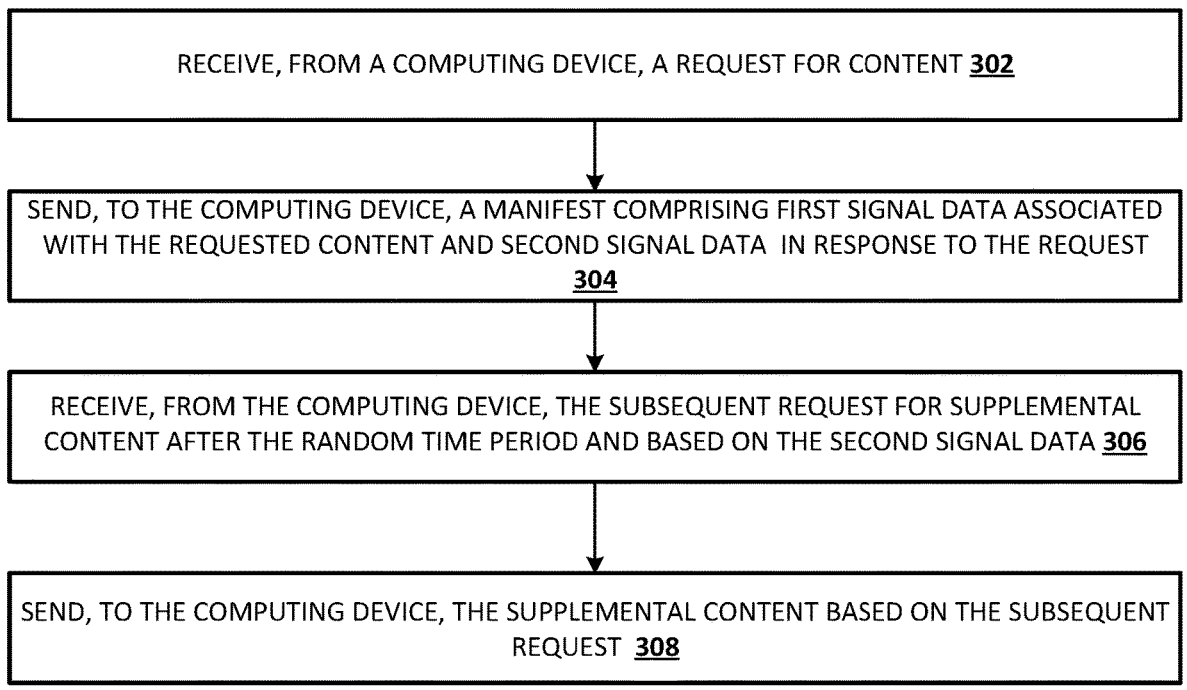
FIG. 3 illustrates an example method.

FIG. 3 illustrates an example method 300. The method 300 may be performed, for example, by the system 100 of FIG. 1. The method 300 illustrates how a computing device, such as the playback device 126 associated with the system 100, may randomize requests (e.g., during time periods of heavy traffic, network congestion, etc.) for supplemental content.

At step 302, a request for content may be received from a computing device. The request may be associated with a selection of the content by a user of the computing device. For example, the request may be associated with a request for linear content, such as a live sporting event or nightly news broadcast.

At step 304, a manifest may be sent to the computing device in response to the request. The manifest may comprise a list of content segments or fragments of video and audio data. For example, the manifest may comprise a list associated with one or more versions or renditions of the requested content, as well as additional information such as resolution, bitrate, and other details of each version or rendition of the requested content. The manifest may comprise first signal data associated with the requested content and second signal data. The second signal data may cause the computing device to make a subsequent request for supplemental content after a random time period. The second signal data may indicate a random time to start the random time period or instructions for deriving the random time to start the random time period. The second signal data may be based on one or more of: expected viewership of the content, historical data associated with the content, or current events associated with the content. The supplemental content may comprise a targeted advertisement.

The second signal data may indicate a predicted marker in a content stream instructing the computing device to request the supplemental content at a time after the random time period. The predicted marker may correspond with a marker in the content stream that indicates an actual time to request the supplemental content, wherein the random time period expires prior to the actual time. The predicted marker may be generated in order to alleviate burdens on the system due to numerous requests for supplemental content. The predicted markers may be determined based on a prediction of the requested supplemental content or a predicted viewership of the requested supplemental content, which may be determined based on numerous factors, including but not limited to historical data (past viewership of related content), political significance, current events (e.g., weather, natural disasters, matters of public concern), geography (e.g., content of local or national interest), etc. In cases of high predicted viewership, the predicted marker may indicate an instruction to request supplemental content (e.g., an advertisement) in anticipation of a corresponding actual marker instructing the computing device to request the supplemental content. The requested supplemental content may be received and cached prior to receiving the corresponding actual marker.

At step 306, the subsequent request for supplemental content may be received from the computing device after the random time period and based on the second signal data. At step 308, the supplemental content may be sent to the computing device based on the subsequent request. The computing device may receive a corresponding actual marker with a timestamp. When the corresponding actual marker is received, the cached content associated with the predicted marker may be output by the computing device instead of sending a real-time request associated with the actual marker. By caching the content associated with the predicted marker ahead of time, burdens on the system associated with a multitude of devices simultaneously requesting content associated with the actual markers may be alleviated. After outputting the supplemental content, the computing device may delete the supplemental content from local storage.

Figure 4:
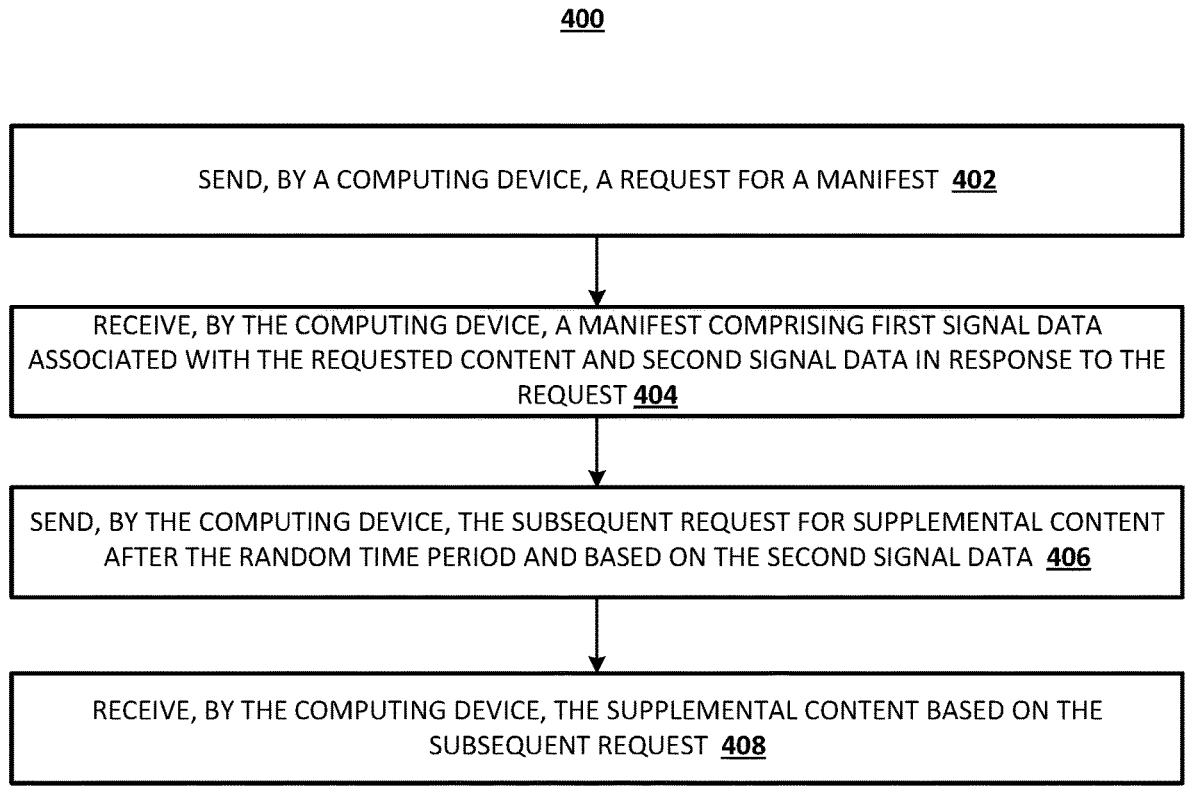
FIG. 4 illustrates an example method.

FIG. 4 illustrates an example method 400. The method 400 may be performed, for example, by the system 100 of FIG. 1. The method 400 illustrates how a computing device, such as the playback device 126 associated with the system 100, may randomize requests (e.g., during time periods of heavy traffic, network congestion, etc.) for supplemental content.

At step 402, a request for a manifest may be sent by a computing device. The request may be associated with a selection of the content by a user of the computing device. For example, the request may be associated with a request for linear content, such as a live sporting event or nightly news broadcast. The requested manifest may comprise one or more content identifiers associated with the content.

At step 404, a manifest may be received by the computing device in response to the request. The manifest may comprise a list of content segments or fragments of video and audio data. For example, the manifest may comprise a list associated with one or more versions or renditions of the requested content, as well as additional information such as resolution, bitrate, and other details of each version or rendition of the requested content. The manifest may comprise first signal data associated with the requested content and second signal data. The second signal data may cause the computing device to make a subsequent request for supplemental content after a random time period. The second signal data may indicate a random time to start the random time period or instructions for deriving the random time to start the random time period. The second signal data may be based on one or more of: expected viewership of the content, historical data associated with the content, or current events associated with the content. The supplemental content may comprise a targeted advertisement.

The second signal data may indicate a predicted marker in a content stream instructing the computing device to request the supplemental content at a time after the random time period. The predicted marker may correspond with a marker in the content stream that indicates an actual time to request the supplemental content, wherein the random time period expires prior to the actual time. The predicted marker may be generated in order to alleviate burdens on the system due to numerous requests for supplemental content. The predicted markers may be determined based on a prediction of the requested supplemental content or a predicted viewership of the requested supplemental content, which may be determined based on numerous factors, including but not limited to historical data (past viewership of related content), political significance, current events (e.g., weather, natural disasters, matters of public concern), geography (e.g., content of local or national interest), etc. In cases of high predicted viewership, the predicted marker may indicate an instruction to request supplemental content (e.g., an advertisement) in anticipation of a corresponding actual marker instructing the computing device to request the supplemental content. The requested supplemental content may be received and cached prior to receiving the corresponding actual marker.

At step 406, the subsequent request for supplemental content may be sent by the computing device after the random time period and based on the second signal data. At step 408, the supplemental content may be received by the computing device based on the subsequent request. The computing device may receive a corresponding actual marker with a timestamp. When the corresponding actual marker is received, the cached content associated with the predicted marker may be output by the computing device instead of sending a real-time request associated with the actual marker. By caching the content associated with the predicted marker ahead of time, burdens on the system associated with a multitude of devices simultaneously requesting content associated with the actual markers may be alleviated. After outputting the supplemental content, the computing device may delete the supplemental content from local storage.

Figure 5:
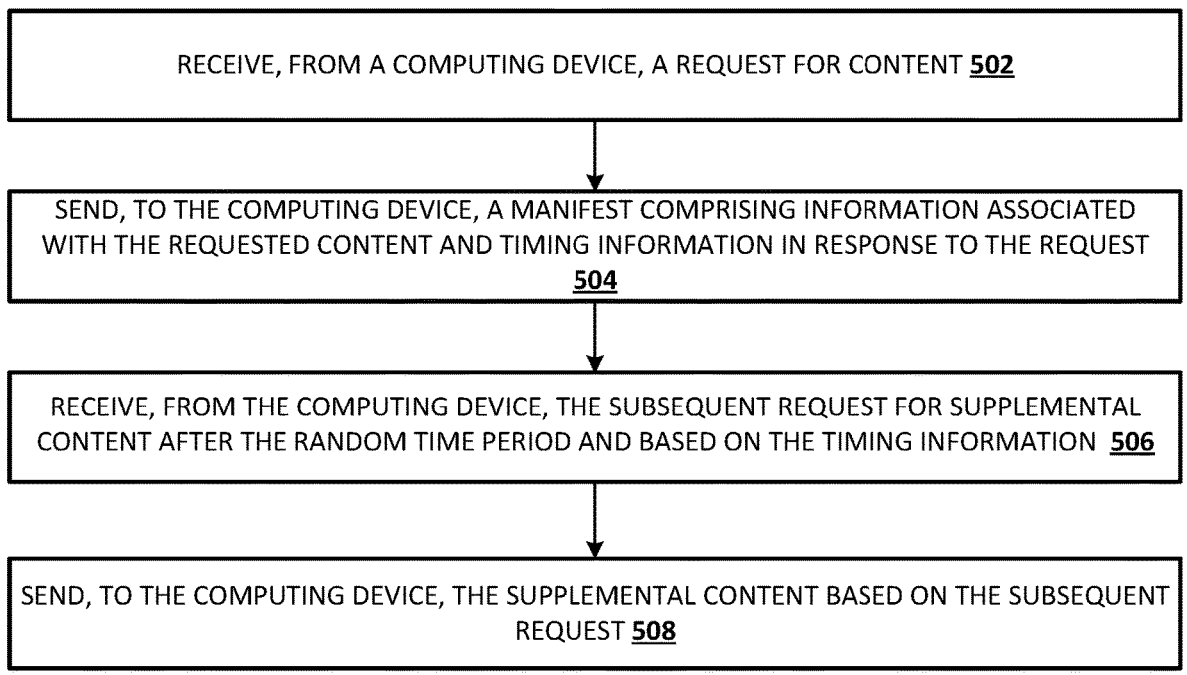
FIG. 5 illustrates an example method.

FIG. 5 illustrates an example method 500. The method 500 may be performed, for example, by the system 100 of FIG. 1. The method 500 illustrates how a computing device, such as the playback device 126 associated with the system 100, may randomize requests (e.g., during time periods of heavy traffic, network congestion, etc.) for supplemental content.

At step 502, a request for content may be received from a computing device. The request may be associated with a selection of the content by a user of the computing device. For example, the request may be associated with a request for linear content, such as a live sporting event or nightly news broadcast.

At step 504, a manifest may be sent to the computing device in response to the request. The manifest may comprise a list of content segments or fragments of video and audio data. For example, the manifest may comprise a list associated with one or more versions or renditions of the requested content, as well as additional information such as resolution, bitrate, and other details of each version or rendition of the requested content. The manifest may comprise information associated with the requested content and timing information. The timing information may cause the computing device to make a subsequent request for supplemental content after a random time period. The timing information may indicate a random time to start the random time period or instructions for deriving the random time to start the random time period. The timing information may be based on one or more of: expected viewership of the content, historical data associated with the content, or current events associated with the content. The supplemental content may comprise a targeted advertisement.

The timing information may indicate a predicted marker in a content stream instructing the computing device to request the supplemental content at a time after the random time period. The predicted marker may correspond with a marker in the content stream that indicates an actual time to request the supplemental content, wherein the random time period expires prior to the actual time. The predicted marker may be generated in order to alleviate burdens on the system due to numerous requests for supplemental content. The predicted markers may be determined based on a prediction of the requested supplemental content or a predicted viewership of the requested supplemental content, which may be determined based on numerous factors, including but not limited to historical data (past viewership of related content), political significance, current events (e.g., weather, natural disasters, matters of public concern), geography (e.g., content of local or national interest), etc. In cases of high predicted viewership, the predicted marker may indicate an instruction to request supplemental content (e.g., an advertisement) in anticipation of a corresponding actual marker instructing the computing device to request the supplemental content. The requested supplemental content may be received and cached prior to receiving the corresponding actual marker.

At step 506, the subsequent request for supplemental content may be received from the computing device after the random time period and based on the timing information. At step 508, the supplemental content may be sent to the computing device based on the subsequent request. The computing device may receive a corresponding actual marker with a timestamp. When the corresponding actual marker is received, the cached content associated with the predicted marker may be output by the computing device instead of sending a real-time request associated with actual marker. By caching the content associated with the predicted marker ahead of time, burdens on the system associated with a multitude of devices simultaneously requesting content associated with the actual markers may be alleviated. After outputting the supplemental content, the computing device may delete the supplemental content from local storage.

Figure 6:
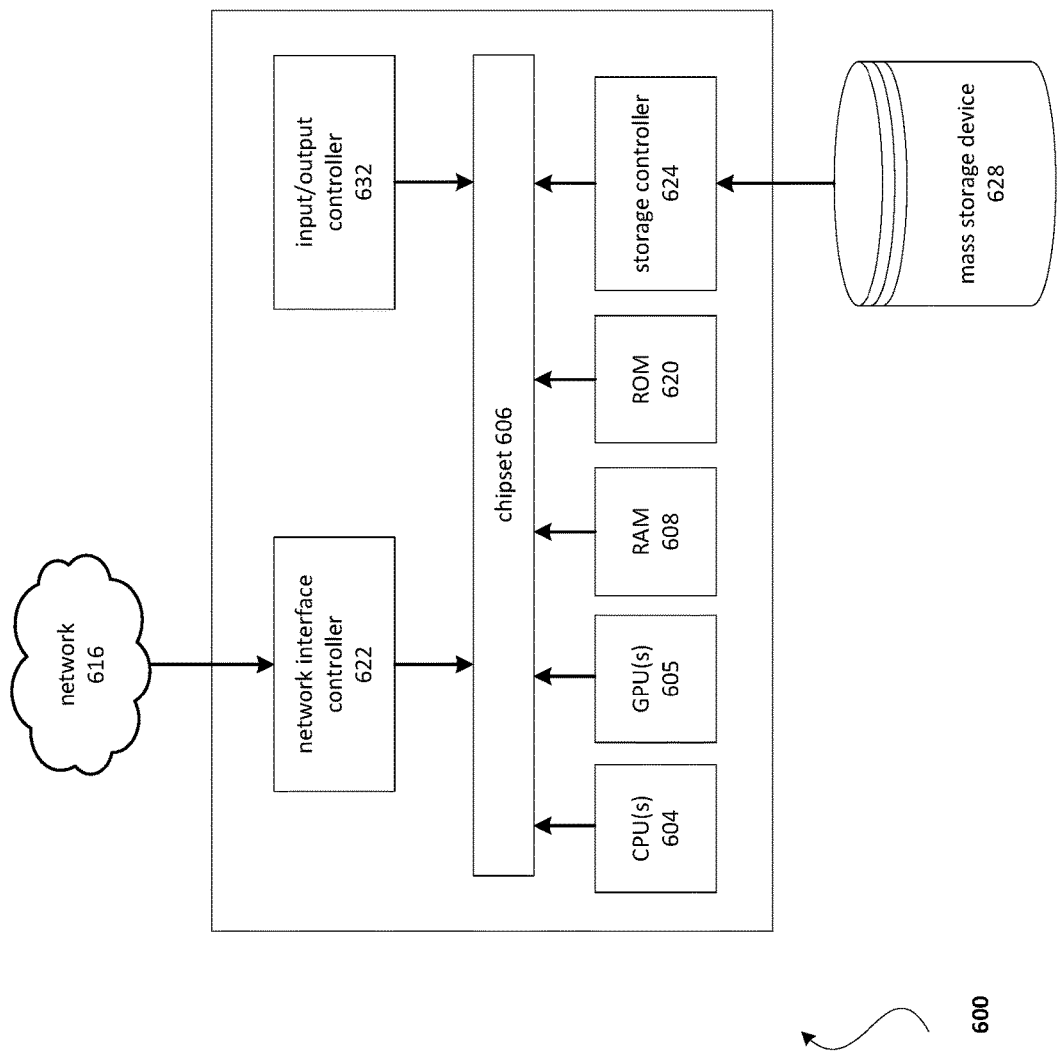
FIG. 6 illustrates a block diagram of an example computing device.

FIG. 6 depicts a computing device that may be used in various aspects. With regard to the example system of FIG. 1, one or more of the media operator 102, the transcoder 110, the packager 114, the playback device 126, the event management system 132, the decision system 138, or the local content datastore 144 may be implemented in an instance of a computing device 600 of FIG. 6. The computer architecture shown in FIG. 6 shows a conventional server computer, workstation, desktop computer, laptop, tablet, network appliance, PDA, e-reader, digital cellular phone, or other computing node, and may be utilized to execute any aspects of the computers described herein, such as to implement the methods described in FIGS. 2-5.

The computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A user interface may be provided between the CPU(s) 604 and the remainder of the components and devices on the baseboard. The interface may be used to access a random-access memory (RAM) 608 used as the main memory in the computing device 600. The interface may be used to access a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein. The user interface may be provided by a one or more electrical components such as the chipset 606.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a storage device 628 that provides non-volatile storage for the computer. The storage device 628 may store system programs, application programs, other content modules, and data, which have been described in greater detail herein. The storage device 628 may be connected to the computing device 600 through a storage controller 624 connected to the chipset 606. The storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 628 is characterized as primary or secondary storage and the like.

For example, the computing device 600 may store information to the storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may read information from the storage device 628 by detecting the physical states or characteristics of one or more particular locations within the physical storage units.

In addition or alternatively to the storage device 628 described herein, the computing device 600 may have access to other computer-readable storage media to store and retrieve information, such as content modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("ID-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 428 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 428 may store other system or application programs and data utilized by the computing device 600.

The storage device 428 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIGS. 2-5.

A computing device, such as the computing device 600 depicted in FIG. 6, may also include an input/output controller 432 for receiving and processing input from a number of input devices, such as a keyboard, a mouse, a touchpad, a touch screen, an electronic stylus, or other type of input device. Similarly, an input/output controller 432 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as determined data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present embodiments may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
   receiving, from a computing device, a request for content;
   sending, to the computing device in response to the request, a manifest comprising first signal data associated with the requested content and second signal data, wherein the second signal data causes the computing device to make a subsequent request for supplemental content after a random time period;
   receiving, based on the second signal data and from the computing device, the subsequent request for supplemental content after the random time period; and
   sending, to the computing device and based on the subsequent request, the supplemental content.

2. The method of claim 1, wherein the second signal data indicates a predicted marker in a content stream instructing the computing device to request the supplemental content at a time after the random time period.

3. The method of claim 2, wherein the predicted marker corresponds with a marker in the content stream that indicates an actual time to request the supplemental content, wherein the random time period expires prior to the actual time.

4. The method of claim 1, wherein the second signal data indicates at least one of:
   a random time to start the random time period, or
   instructions for deriving the random time to start the random time period.

5. The method of claim 1, wherein the second signal data instructs the computing device to store the supplemental content in a local storage, and after outputting the supplemental content, to delete the supplemental content from the local storage.

6. The method of claim 1, wherein the second signal data is based on one or more of: expected viewership of the content, historical data associated with the content, or current events associated with the content.

7. The method of claim 1, wherein the supplemental content comprises a targeted advertisement.

8. A method comprising:
sending, by a computing device, a request for a manifest;
receiving, by the computing device in response to the request for the manifest, the manifest first signal data associated with the requested content and second signal data, wherein the second signal data causes the computing device to make a subsequent request for supplemental content after a random time period;
sending, by the computing device and based on the second signal data, the subsequent request for supplemental content after the random time period; and
receiving, by the computing device and based on the subsequent request, the supplemental content.

9. The method of claim 8, wherein the second signal data indicates a predicted marker in a content stream instructing the computing device to request the supplemental content at a time after the random time period.

10. The method of claim 9, wherein the predicted marker corresponds with a marker in the content stream that indicates an actual time to request the supplemental content, wherein the random time period expires prior to the actual time.

11. The method of claim 8, further comprising:
storing, by the computing device and based on the second signal data, the supplemental content in a local storage; and
deleting, by the computing device and after outputting the supplemental content, the supplemental content from the local storage.

12. The method of claim 8, wherein the second signal data indicates at least one of:
a random time to start the random time period, or
instructions for deriving the random time to start the random time period.

13. The method of claim 8, wherein the second signal data is based on one or more of: expected viewership of the content, historical data associated with the content, or current events associated with the content.

14. The method of claim 8, wherein the supplemental content comprises a targeted advertisement.

15. A method comprising:
receiving, from a computing device, a request for content;
sending, to the computing device in response to the request, a manifest comprising information associated with the requested content and timing information, wherein the timing information causes the computing device to make a subsequent request for supplemental content after a random time period;
receiving, based on the timing information and from the computing device, the subsequent request for supplemental content after the random time period; and
sending, to the computing device and based on the subsequent request, the supplemental content.

16. The method of claim 15, wherein the timing information indicates a predicted marker in a content stream instructing the computing device to request the supplemental content at a time after the random time period.

17. The method of claim 16, wherein the predicted marker corresponds with a marker in the content stream that indicates an actual time to request the supplemental content, wherein the random time period expires prior to the actual time.

18. The method of claim 15, wherein the timing information indicates at least one of:
a random time to start the random time period, or
instructions for deriving the random time to start the random time period.

19. The method of claim 15, wherein the timing information is based on one or more of: expected viewership of the content, historical data associated with the content, or current events associated with the content.

20. The method of claim 15, wherein the supplemental content comprises a targeted advertisement.

\* \* \* \* \*